United States Patent
Jokanovic et al.

(10) Patent No.: US 10,281,572 B1
(45) Date of Patent: May 7, 2019

(54) PHASE CORRECTION FOR OBJECT DETECTION INCLUDING TDMA

(71) Applicant: Delphi Technologies, LLC, Troy, MI (US)

(72) Inventors: Branka Jokanovic, Agoura Hills, CA (US); Lei Lei, Calabasas, CA (US)

(73) Assignee: Delphi Technologies, LLC, Troy, MI (US)

( * ) Notice: Subject to any disclaimer, the term of this patent is extended or adjusted under 35 U.S.C. 154(b) by 0 days.

(21) Appl. No.: 15/988,150

(22) Filed: May 24, 2018

(51) Int. Cl.
| | | |
|---|---|---|
| *G01S 7/41* | (2006.01) | |
| *G01S 7/42* | (2006.01) | |
| *G06T 7/246* | (2017.01) | |
| *G01S 13/524* | (2006.01) | |

(52) U.S. Cl.
CPC .......... *G01S 13/524* (2013.01); *G01S 7/415* (2013.01); *G01S 7/42* (2013.01); *G06T 7/248* (2017.01); *G06T 2207/10044* (2013.01)

(58) Field of Classification Search
CPC ........ G01S 13/931; G01S 13/26; G01S 13/42; G01S 13/426
See application file for complete search history.

(56) References Cited

U.S. PATENT DOCUMENTS

| | | | |
|---|---|---|---|
| 7,639,171 B2 | 12/2009 | Alland et al. | |
| 2005/0285785 A1* | 12/2005 | Martin | H01Q 3/2611 342/372 |
| 2008/0074307 A1* | 3/2008 | Boric-Lubecke | A61B 5/0205 342/28 |

OTHER PUBLICATIONS

Guetlien, et al.: Switching Scheme for a FMCW-MIMO Radar on a Moving Platform, Oct. 31-Nov. 2, Amsterdam The Netherlands, pp. 91-94.

\* cited by examiner

*Primary Examiner* — Ross Varndell
(74) *Attorney, Agent, or Firm* — Lawrence D. Hazeltor

(57) ABSTRACT

An illustrative example object detection system includes a plurality of first transmitters that respectively transmit a first signal at a first time, a plurality of second transmitters that respectively transmit a second signal at a second time, a plurality of receivers that receive the signals, and a processor that is configured to determine whether a transmission timing phase shift exists between the received first signals and the received second signals based on a relationship between matrices including the received signals.

18 Claims, 3 Drawing Sheets

PHASE CORRECTION FOR OBJECT DETECTION INCLUDING TDMA

BACKGROUND

A variety of scenarios require signal handling. For example, radar systems and wireless communication systems include over-the-air signaling. One challenge associated with such systems is using multiple signals to increase information regarding detected objects while avoiding processing difficulties introduced by using multiple signals. For example, it is necessary for different signals to be orthogonal so that they can be individually detected and processed. One way of achieving orthogonality involves time division multiplexing (TDMA) in which signal transmissions are separated in time.

While TDMA can be an efficient way of increasing the number of signals available for object detection and analysis, TDMA techniques may introduce signaling errors that have to be addressed to provide accurate detection information. For example, TDMA may introduce an additional phase shift based on the difference in transmission timing and such a phase shift could skew object detection information if it is not properly recognized or its influence is not removed from the received detection signal processing techniques. When detecting moving objects TDMA-based phase shifts are related to the unknown velocity of the moving object, which increases the difficulties associated with processing detection signals including such a phase shift.

SUMMARY

An illustrative example object detection system includes a plurality of first transmitters that respectively transmit a first signal at a first time, a plurality of second transmitters that respectively transmit a second signal at a second time, a plurality of receivers that receive the signals, and a processor that is configured to determine whether a transmission timing phase shift exists between the received first signals and the received second signals based on a relationship between matrices including the received signals.

An illustrative example object detection method includes transmitting first signals at a first time from a plurality of first transmitters, transmitting second signals at a second time from a plurality of second transmitters, receiving the signals at a plurality of receivers, and determining whether a transmission timing phase shift exists between the received first signals and the received second signals based on a relationship between matrices including the received signals.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention allow for effective and accurate object detection when signals, such as RADAR, are transmitted using time division multiplexing (TDMA). Any phase shift introduced by TDMA can be detected and effectively removed from the signal processing based on determining a relationship between matrices that include the received signals. In an example embodiment, a relationship between traces of covariance matrices including the received signals indicates whether a TDMA phase shift exists and received signals can be processed based on that information.

Figure 1:
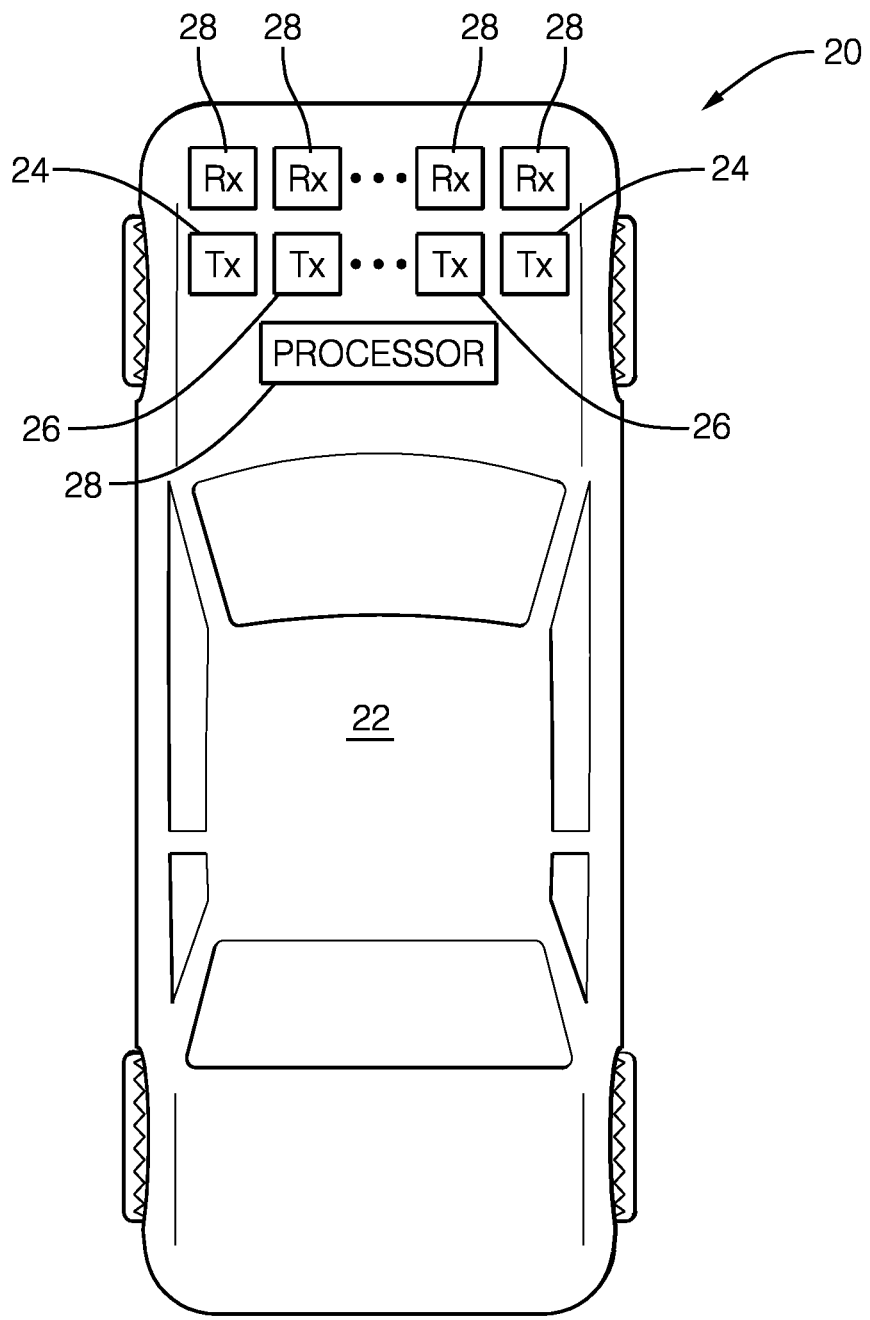
FIG. 1 diagrammatically illustrates an object detection system designed according to an embodiment of this invention.

FIG. 1 schematically illustrates an object detection system 20 supported on a vehicle 22. The system 20 includes a plurality of first transmitters 24 that transmit respective first signals at a first time. A plurality of second transmitters 26 respectively transmit second signals at a second time. The first and second signals are transmitted using TDMA. In the illustrated example embodiment the signals are linear frequency-modulated continuous wave signals, such as those typically used for automotive RADAR. Other signal types are used in some embodiments.

The system 20 includes a plurality of receivers 28 that receive the first and second signals after those signals reflect off an object in a vicinity or pathway of the vehicle 22. FIG. 1 shows two first transmitters 24, two second transmitters 26 and four receivers 28 but the illustrated embodiment includes more of each. One example embodiment of the system 20 includes four first transmitters 24, four second transmitters 26 and thirty-two receivers 28.

A processor 30 is configured to process the received signals to make determinations regarding a detected or tracked object, such as the range, angle and Doppler velocity of the object. The processor 30 is configured to compensate for a transmission timing phase shift that may exist between the received first signals and the received second signals. The processor 30 determines whether a transmission phase shift exists based on a relationship between matrices that include the received signals.

The processor includes at least one computing device, such as a microprocessor, and memory. The processor 30 may be a dedicated device or component or be realized through part of an existing controller or processor on the vehicle 22 that is also used for other purposes. Those skilled in the art who have the benefit of this description will realize what arrangement of a processor, transmitters and receivers will meet their particular needs.

Figure 2:
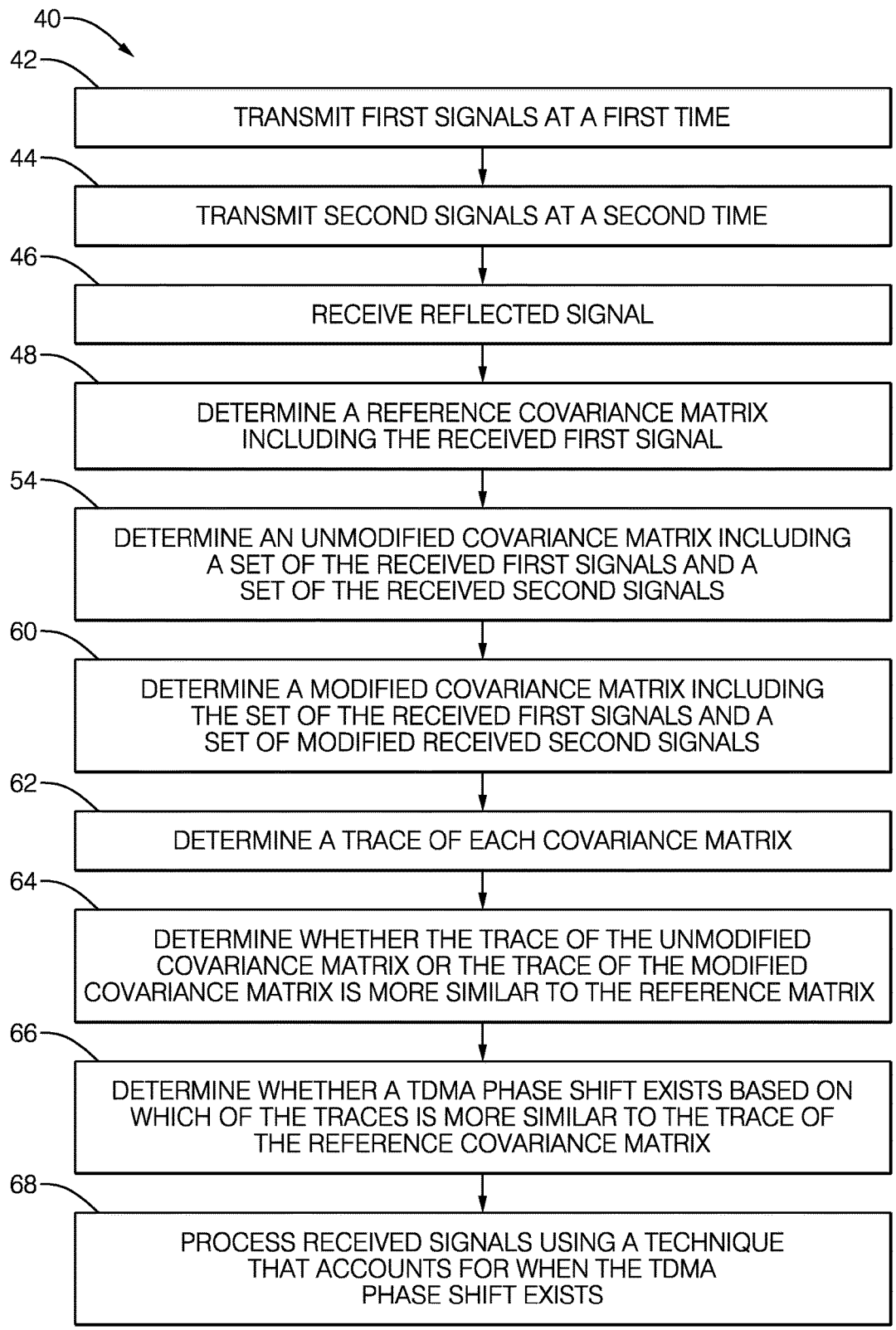
FIG. 2 is a flow chart diagram summarizing an example technique designed according to an embodiment of this invention.

FIG. 2 is a flowchart diagram 40 that summarizes an example approach of using TDMA to achieve signal orthogonality in MIMO radars. At 42, the first transmitters 24 transmit the first signals at a first time. The second transmitters transmit the second signals at 44. The second transmission time of the second signals in this example is subsequent to the first transmission time. The TDMA technique of this example includes repeatedly transmitting the first and second signals at scheduled intervals.

At 46, the receivers 28 receive the signals reflected from an object. The received signal at any of the receivers 28, which can be considered a (n,m) receiver array element, can be represented as a delayed transmitted signal with the following equation.

$$s_{n,m}(t) = A e^{j\varphi_R} e^{j\varphi_\theta} e^{j\varphi_D} e^{j\varphi_S} \tag{1}$$

where t is the discretized time; $\varphi_R, \varphi_\theta, \varphi_D$ are phase terms containing information about the detected object's range, angle, and velocity respectively; and $\varphi_S$ is the phase term due to the sequential transmitter activation.

The total delay in the signal represented in equation (1) includes four terms. Each of these terms provides information related to the target or detected object. The first delay $\varphi_R$ is due to the distance between the reference point of the array of receivers 28 and the object and can be used to compute the object range. The second delay $\varphi_O$ is the result of the position of the receiver 28 with respect to the reference point of the receiver array. The second delay $\varphi_\theta$ is used to compute the target angle. The third delay $\varphi_D$ is a consequence of a moving object or a moving platform and is useful to determine the object's velocity. The $\varphi_S$ delay is due to the TDMA sequential transmitter activation. The processor 30 is configured to determine whether $\varphi_S$ exists and to estimate $\varphi_S$ for proper data analysis.

In the example embodiment the TDMA strategy includes activating the second transmitters 26 at one-half the pulse repetition interval of the first transmitters 24. This allows for $\varphi_S$ to be represented by the following equation.

$$\varphi_S = 2\pi \frac{2v}{\lambda} T \qquad (2)$$

where the pulse repetition interval is 2T, $\lambda$ denotes the wavelength and $v$ is the object's true velocity. The following equation describes that velocity.

$$v = v_m + l v_{un}, l = 0, \pm 1, \pm 2, \ldots \qquad (3)$$

where $v_m$ is the measured target's velocity and $v_{un}$ is the maximum unambiguous detectable velocity, $v_{un} = \lambda/(4T)$. Replacing equation (3) into equation (2), $\varphi_S$ becomes:

$$\varphi_S = 4\pi(v_m/\lambda)T + 4\pi l(v_{un}/\lambda)T = 4\pi(v_m/\lambda)T + l\pi \qquad (4)$$

Based on equation (4), it can be observed that the $\varphi_S$ phase term introduces a phase shift of 0 or 180 degrees depending on the target's true velocity $v$. Since the target's velocity is not known a priori, the processor 30 is configured to estimate this phase shift for proper data analysis.

Figure 3:
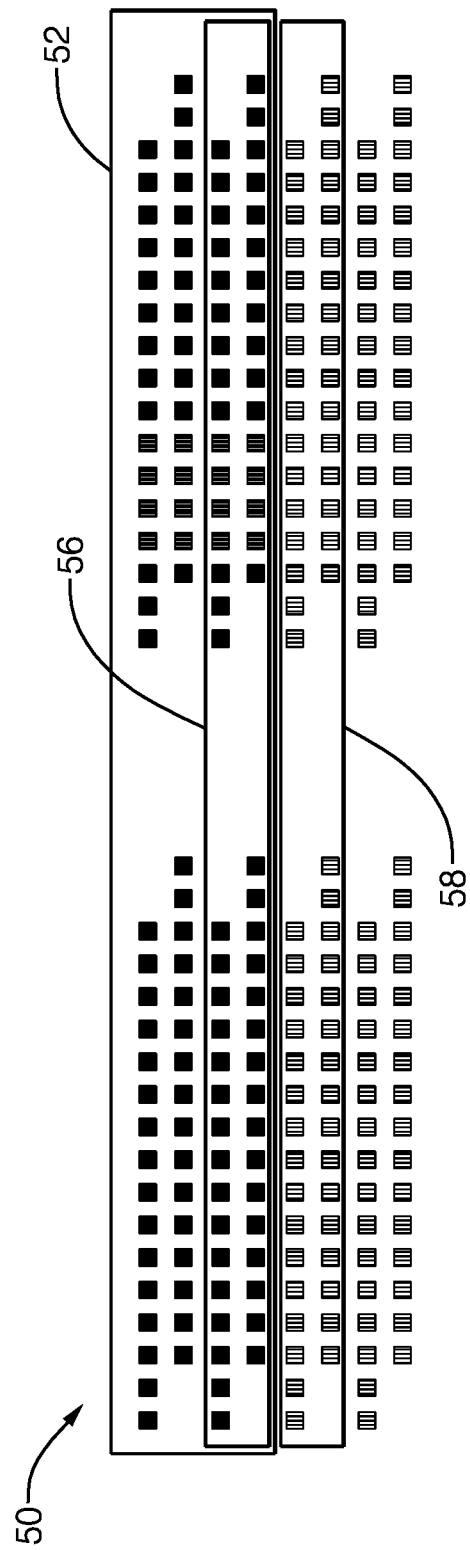
FIG. 3 schematically illustrates matrices useful in an embodiment of this invention.

In FIG. 2, the processor determines a reference covariance matrix including the received first signals at 48. FIG. 3 schematically shows received signals at 50. The illustration includes 256 received signals representing each of thirty-two receivers 28 receiving a reflected first signal from each of four first transmitters 24 and a reflected second signal from each of four second transmitters 26. The received first signals are included in a reference set enclosed in the box 52. In this example all of the received first signals from a single first transmission time are included in the reference set. The processor 30 determines the reference covariance matrix using the first signals in the reference set 52.

At 54 in FIG. 2, the processor determines an unmodified covariance matrix including at least some of the received first signals and at least some of the received second signals. In this example, a set of the received first signals enclosed in the box 56 in FIG. 3 is included in the unmodified covariance matrix. This set 56 is a subset of the received first signals and can be represented by $Y_1$. The unmodified covariance matrix also includes a set of the received second signals enclosed in the box 58. This set of second signals is a subset of all of the received second signals and can be represented by $Y_2$. In this example, the unmodified covariance matrix can be represented by $R_{xy}$ of matrix $|Y_1, Y_2|$.

At 60 in FIG. 2, the processor 30 determines a modified covariance matrix using the first signals in $Y_1$ and a modified version of the set 58 of second signals. In this example, the processor 30 determines modified values of the second signals in the set 58 by multiplying each by $-1$. That set of modified values can be represented as $-Y_2$. The modified covariance matrix determined at 60 can be represented by $R_{xy'}$ of matrix $|Y_1, -Y_2|$.

In this example, the modified covariance matrix includes using $-1$ as a factor applied to the received second signals in the set 58 because $\varphi_S$ is part of an exponential function. Accordingly, Euler's identity indicates that the received signal is effectively multiplied by 1 if there is no transmission timing phase shift and multiplied by $-1$ if there is such a phase shift (i.e., $e^{j\varphi_S} = e^{j(4\pi(v_m/\lambda)T + l\pi)} = (-1)^l e^{j4\pi(v_m/\lambda)T}$).

At 62, the processor 30 determines respective traces of the covariance matrices. The processor uses a relationship between the covariance matrices as basis to determine whether a TDMA or transmission timing phase shift $\varphi_S$ exists.

A covariance matrix of an N×N square matrix X is defined as $R_{XX} = XX^T$, and its trace value can be computed in a known manner as $$tr(R) = \sum_{i=1}^{N} R_{ii} \qquad (5)$$

In this example, the processor 30 determines at 64 which of $R_{xy}$ or $R_{xy'}$ is more similar to the reference covariance matrix. At 66, the processor 30 determines whether a TDMA phase shift exists based on which of the traces is more similar to the trace of the reference covariance matrix. If the trace of the modified covariance matrix is more similar to the reference covariance matrix that indicates that the transmission timing phase shift does exist. If, on the other hand, the trace of the unmodified covariance matrix is more similar to the reference covariance matrix that indicates that the transmission timing phase shift does not exist.

The processor 30 is configured to process the received signals based on a technique that accounts for the existence or absence of a transmission timing phase shift $\varphi_S$ at 68. In this example, when there is no phase shift the fourth phase term of equation (1) is eliminated and signal processing to determine the object's range, angle and Doppler velocity proceeds without $\varphi_S$. On the other hand when $\varphi_S$ exists, the processor includes a 180 degree shift value for $\varphi_S$ in equation (1).

The example embodiment facilitates using cost-effective TDMA signaling techniques without difficulties or errors otherwise associated with introducing a TDMA phase shift between signals. The disclosed system and method improve object detection and tracking efficiency and accuracy.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. An object detection system, comprising:
 a plurality of first transmitters that respectively transmit a first signal at a first time;
 a plurality of second transmitters that respectively transmit a second signal at a second time;
 a plurality of receivers that receive the signals; and
 a processor that is configured to determine whether a transmission timing phase shift exists between the received first signals and the received second signals based on a relationship between matrices including the received signals, wherein the matrices comprise covariance matrices and the processor is configured to determine a reference covariance matrix of the received first signals;

determine an unmodified covariance matrix including at least part of the received first signals and at least part of the received second signals;

determine a set of modified second signal values for the part of the received second signals multiplied by −1;

determine a modified covariance matrix including the part of the received first signals and the set of modified second signal values; and determine the relationship between the matrices based on (i) a relationship between the reference covariance matrix and the unmodified covariance matrix and (ii) a relationship between the reference covariance matrix and the modified covariance matrix.

2. The object detection system of claim 1, wherein the processor is configured to determine a reference trace T of the reference covariance matrix;

determine a trace Tu of the unmodified covariance matrix;

determine a trace Tm of the modified covariance matrix;

determine the relationship between the reference covariance matrix and the unmodified covariance matrix based on a relationship between the reference trace T and the trace Tu; and determine the relationship between the reference covariance matrix and the modified covariance matrix based on a relationship between the reference trace T and the trace Tm.

3. The object detection system of claim 2, wherein the processor is configured to determine whether the reference trace T is more similar to the trace Tu or the trace Tm; and determine whether the transmission timing phase shift exists based on which of the traces Tu or Tm is more similar to the reference trace T.

4. The object detection system of claim 3, wherein the processor is configured to determine that the transmission timing phase shift exists when the reference trace T is more similar to the trace Tm than the trace Tu; and determine that the transmission timing phase shift does not exist when the reference trace T is more similar to the trace Tu than the trace Tm.

5. The object detection system of claim 4, wherein the processor is configured to use a phase shift value of 180° for processing at least some of the received signals when the transmission timing phase shift exists.

6. The object detection system of claim 1, wherein there are four first transmitters;

there are four second transmitters;

there are thirty-two receivers;

there are one hundred twenty-eight received first signals in the reference covariance matrix;

there are sixty-four received first signals in the part of the received first signals; and there are sixty-four received second signals in the part of the received second signals.

7. The object detection system of claim 1, wherein the signals comprise RADAR signals; and the receivers receive the signals after the signals reflect off an object.

8. The object detection system of claim 1, wherein the matrices comprise covariance matrices including at least some of the received signals;

the processor is configured to determine traces of the covariance matrices; and the relationship between the matrices comprises a relationship between the traces of the covariance matrices.

9. The object detection system of claim 8, wherein the processor is configured to use a phase shift value of 180° for processing at least some of the received signals when the transmission timing phase shift exists.

10. An object detection method, comprising:

transmitting first signals at a first time from a plurality of first transmitters;

transmitting second signals at a second time from a plurality of second transmitters;

receiving the signals at a plurality of receivers; and determining whether a transmission timing phase shift exists between the received first signals and the received second signals based on a relationship between matrices including the received signals, wherein the matrices comprise covariance matrices and the method comprises determining a reference covariance matrix of the received first signals;

determining an unmodified covariance matrix including at least part of the received first signals and at least part of the received second signals;

determining a set of modified second signal values for the part of the received second signals multiplied by −1;

determining a modified covariance matrix including the part of the received first signals and the set of modified second signal values; and determining the relationship between the matrices based on (i) a relationship between the reference covariance matrix and the unmodified covariance matrix and (ii) a relationship between the reference covariance matrix and the modified covariance matrix.

11. The method of claim 10, comprising determining a reference trace T of the reference covariance matrix;

determining a trace Tu of the unmodified covariance matrix;

determining a trace Tm of the modified covariance matrix;

determining the relationship between the reference covariance matrix and the unmodified covariance matrix based on a relationship between the reference trace T and the trace Tu; and determining the relationship between the reference covariance matrix and the modified covariance matrix based on a relationship between the reference trace T and the trace Tm.

12. The method of claim 11, comprising determining whether the reference trace T is more similar to the trace Tu or the trace Tm; and determining whether the transmission timing phase shift exists based on which of the traces Tu or Tm is more similar to the reference trace T.

13. The method of claim 12, comprising determining that the transmission timing phase shift exists when the reference trace T is more similar to the trace Tm than the trace Tu; and determining that the transmission timing phase shift does not exist when the reference trace T is more similar to the trace Tu than the trace Tm.

14. The method of claim 13, comprising using a phase shift value of 180° for processing at least some of the received signals when the transmission timing phase shift exists.

15. The method of claim 10, wherein
there are four first transmitters;
there are four second transmitters;
there are thirty-two receivers;
there are one hundred twenty-eight received first signals in the reference covariance matrix;
there are sixty-four received first signals in the part of the received first signals; and
there are sixty-four received second signals in the part of the received second signals.

16. The method of claim 10, wherein
the signals comprise RADAR signals; and
the receivers receive the signals after the signals reflect off an object.

17. The method of claim 10, wherein
the matrices comprise covariance matrices including at least some of the received signals;
the method includes determining traces of the covariance matrices; and
the relationship between the matrices comprises a relationship between the traces of the covariance matrices.

18. The method of claim 17, comprising using a phase shift value of 180° for processing at least some of the received signals when the transmission timing phase shift exists.

* * * * *